(12) United States Patent
Kaszas

(10) Patent No.: US 7,402,633 B2
(45) Date of Patent: Jul. 22, 2008

(54) HALOGENATED TERPOLYMERS OF ISOBUTYLENE, DIOLEFIN MONOMER AND STYRENIC MONOMER

(75) Inventor: Gabor Kaszas, London (CA)

(73) Assignee: Lanxess Inc., Sarnia, Ontario (CA)

( * ) Notice: Subject to any disclaimer, the term of this patent is extended or adjusted under 35 U.S.C. 154(b) by 139 days.

(21) Appl. No.: 11/208,320

(22) Filed: Aug. 19, 2005

(65) Prior Publication Data

US 2006/0116484 A1 Jun. 1, 2006

Related U.S. Application Data

(62) Division of application No. 10/390,113, filed on Mar. 17, 2003, now Pat. No. 6,960,632, which is a division of application No. 10/070,955, filed on Mar. 13, 2002, now abandoned.

(30) Foreign Application Priority Data

Sep. 20, 1999 (CA) .................................. 2282900

(51) Int. Cl.
*C08F 8/18* (2006.01)
(52) U.S. Cl. .................... 525/332.8; 525/355; 525/356
(58) Field of Classification Search ............... 525/332.8
See application file for complete search history.

(56) References Cited

U.S. PATENT DOCUMENTS

| | | | |
|---|---|---|---|
| 2,497,458 A | 2/1950 | Kurtz, Jr. | 260/45.5 |
| 2,513,183 A | 6/1950 | Kurtz, Jr. | 260/45.5 |
| 2,539,523 A | 1/1951 | Reid, Jr. | 260/80.5 |
| 2,631,953 A | 3/1953 | Hubbard et al. | 154/43 |
| 2,676,950 A | 4/1954 | Sparks et al. | 260/80.7 |
| 2,804,448 A | 8/1957 | Hallenbeck | 260/85.3 |
| 2,891,595 A | 6/1959 | Kuntz et al. | 152/330 |
| 2,965,621 A | 12/1960 | Serniuk et al. | 260/85.3 |
| 2,968,041 A | 1/1961 | Skold | 1/49.1 |
| 2,994,578 A | 8/1961 | Guinot | 23/2 |
| 3,042,662 A | 7/1962 | Cottle et al. | 260/85.3 |
| 3,560,458 A | 2/1971 | Kennedy et al. | 260/85.3 |
| 3,808,177 A | 4/1974 | Thaler et al. | 260/80.7 |
| 3,948,868 A | 4/1976 | Powers | 260/80.7 |
| 4,026,966 A | 5/1977 | Baldwin et al. | 260/878 R |
| 4,145,490 A | 3/1979 | Harris, Jr. et al. | 526/19 |
| 4,395,506 A | 7/1983 | Nagano et al. | 524/68 |
| 4,779,657 A | 10/1988 | Cheung et al. | 152/510 |
| 5,162,445 A | 11/1992 | Powers et al. | 525/333.4 |
| 5,556,907 A | 9/1996 | Fuchs et al. | 524/493 |
| 5,591,551 A | 1/1997 | Audett et al. | 430/18 |
| 5,681,901 A | 10/1997 | Newman | 525/356 |
| 5,698,640 A | 12/1997 | Duvdevani et al. | 525/333.4 |
| 5,886,106 A | 3/1999 | Sumner et al. | 515/332.8 |
| 6,960,632 B2 | 11/2005 | Kaszas | 525/332.8 |
| 2003/0220437 A1 | 11/2003 | Hopkins et al. | 524/492 |
| 2004/0092648 A1 | 5/2004 | Jones et al. | 524/502 |
| 2004/0180163 A1 | 9/2004 | Wang et al. | 428/35.7 |
| 2004/0242713 A1 | 12/2004 | Ghindoni et al. | 521/50 |
| 2004/0242795 A1 | 12/2004 | Waddell et al. | 525/331.9 |

FOREIGN PATENT DOCUMENTS

| | | |
|---|---|---|
| EP | 803.518 | 9/2001 |
| EP | 1 557 162 | 7/2005 |
| FR | 1132894 | 3/1957 |
| GB | 842 557 | 6/1957 |
| JP | 2001-181448 | 7/2001 |
| JP | 2002-65898 | 9/2002 |
| WO | 91/04995 | 4/1991 |
| WO | 97/06589 | 2/1997 |

OTHER PUBLICATIONS

Macromolecules, 18 (month unavailable) 1985, pp. 1423-1430, Chia Yeh Chu and Rastko Vukov, "Determination of the Structure of Butyl Rubber by NMR Spectroscopy".

Rubber Chem. Technol., Mar. 9, 1987, pp. 636-646, Chia Yeh Chu, Kenneth Norman Watson and Rastko Vukov, Determination of the Structure of Chlorobutyl and Bromobutyl Rubber by NMR Spectroscopy.

Marchionna, F. Recent Advances in Butallistic Polymers (1954), vol. 1, p. 444-445.

*Primary Examiner*—Bernard Lipman
(74) *Attorney, Agent, or Firm*—Jennifer R. Sang

(57) ABSTRACT

A halogenated butyl polymer having improved properties, the butyl polymer derived from a monomer mixture comprising a $C_4$ to $C_8$ monoolefin monomer, a $C_4$ to $C_{14}$ multiolefin monomer and a styrenic monomer with a catalyst system to produce the butyl polymer. The improved properties include faster cure, higher maximum torque, higher delta torque, relatively stable modulus over time, improved hot air aging properties and improved aged flexure properties. These improved properties are believed to result from direct interaction between the styrenic moieties in the polymer backbone with a crosslinking agent added to vulcanize the halogenated butyl rubber.

12 Claims, 8 Drawing Sheets

HALOGENATED TERPOLYMERS OF ISOBUTYLENE, DIOLEFIN MONOMER AND STYRENIC MONOMER

This application is a Divisional of Ser. No. 10/390,113 filed Mar. 17, 2003 now U.S. Pat. No. 6,960,632 which is a Divisional of Ser. No. 10/070,955 filed Mar. 13, 2002 now abandoned.

In one of its aspects, the present invention relates to a halogenated butyl polymer. In another of its aspects, the present invention relates to a process for production of a butyl polymer.

Butyl polymer or rubber is well known in the art, particularly in its application in the production of tires.

Further, the use of halogenated butyl rubbers is known since such rubbers have particularly advantageous adhesion behaviour, flexural strength, service life and impermeability to air and water.

Despite this, there is room for improvement. Specifically, as manufacturer warranties for tires continue to increase in term, there is an ongoing desire and need to extend the useful service life of the tire. This projects into a need to improve the properties of the components of the tire, including the rubber (e.g., halogenated butyl rubber) components. This is becoming especially important in tire retreading applications.

Thus, there is a continuing need in the art for halogenated butyl rubbers, inter alia, having improved curing and/or aging properties.

It is an object of the present invention to provide a novel halogenated butyl polymer.

It is another object of the present invention to provide a novel process for producing a halogenated butyl polymer.

It is yet another objection of the present invention to provide a novel vulcanizate derived from a halogenated butyl polymer.

Accordingly, in one of its aspects, the present invention provides a halogenated butyl polymer having improved curing and/or aging properties, the butyl polymer derived from a monomer mixture comprising a $C_4$ to $C_8$ monoolefin monomer, a $C_4$ to $C_{14}$ multiolefin monomer and a styrenic monomer.

In another of its aspects, the present invention provides a process for preparing a halogenated butyl polymer having improved curing and/or aging properties, the process comprising the steps of:

contacting a monomer mixture comprising a $C_4$ to $C_8$ monoolefin monomer, a $C_4$ to $C_{14}$ multiolefin monomer and a styrenic monomer with a catalyst system to produce a terpolymer; and halogenating the terpolymer to produce the halogenated butyl polymer.

In another of its aspects, the present invention provides a vulcanizate derived from a vulcanizable mixture comprising: a halogenated butyl polymer derived from a monomer mixture comprising a $C_4$ to $C_8$ monoolefin monomer, a $C_4$ to $C_{14}$ multiolefin monomer and a styrenic monomer; a filler; and a vulcanization agent.

Thus, the present invention relates to butyl rubber polymers. The terms "butyl rubber", "butyl polymer" and "butyl rubber polymer" are used throughout this specification interchangeably and each is intended to denote polymers prepared by reacting a monomer mixture comprising a $C_4$ to $C_8$ monoolefin monomer, a $C_4$ to $C_{14}$ multiolefin monomer and a styrenic monomer.

It has been surprisingly and unexpectedly discovered that halogenating a terpolymer derived from a monomer mixture comprising a $C_4$ to $C_8$ monoolefin monomer, a $C_4$ to $C_{14}$ multiolefin monomer and a styrenic monomer results in a polymer having improved properties compared to a polymer produced by halogenating a copolymer derived from a monomer mixture comprising a $C_4$ to $C_8$ monoolefin monomer and a $C_4$ to $C_{14}$ multiolefin monomer. The improved properties include faster cure, higher maximum torque, higher delta torque, relatively stable modulus over time, improved hot air aging properties and improved aged flexure properties. These improved properties are believed to result from direct interaction between the styrenic moieties in the polymer backbone with a crosslinking agent added to vulcanize the halogenated butyl rubber.

Figure 1:
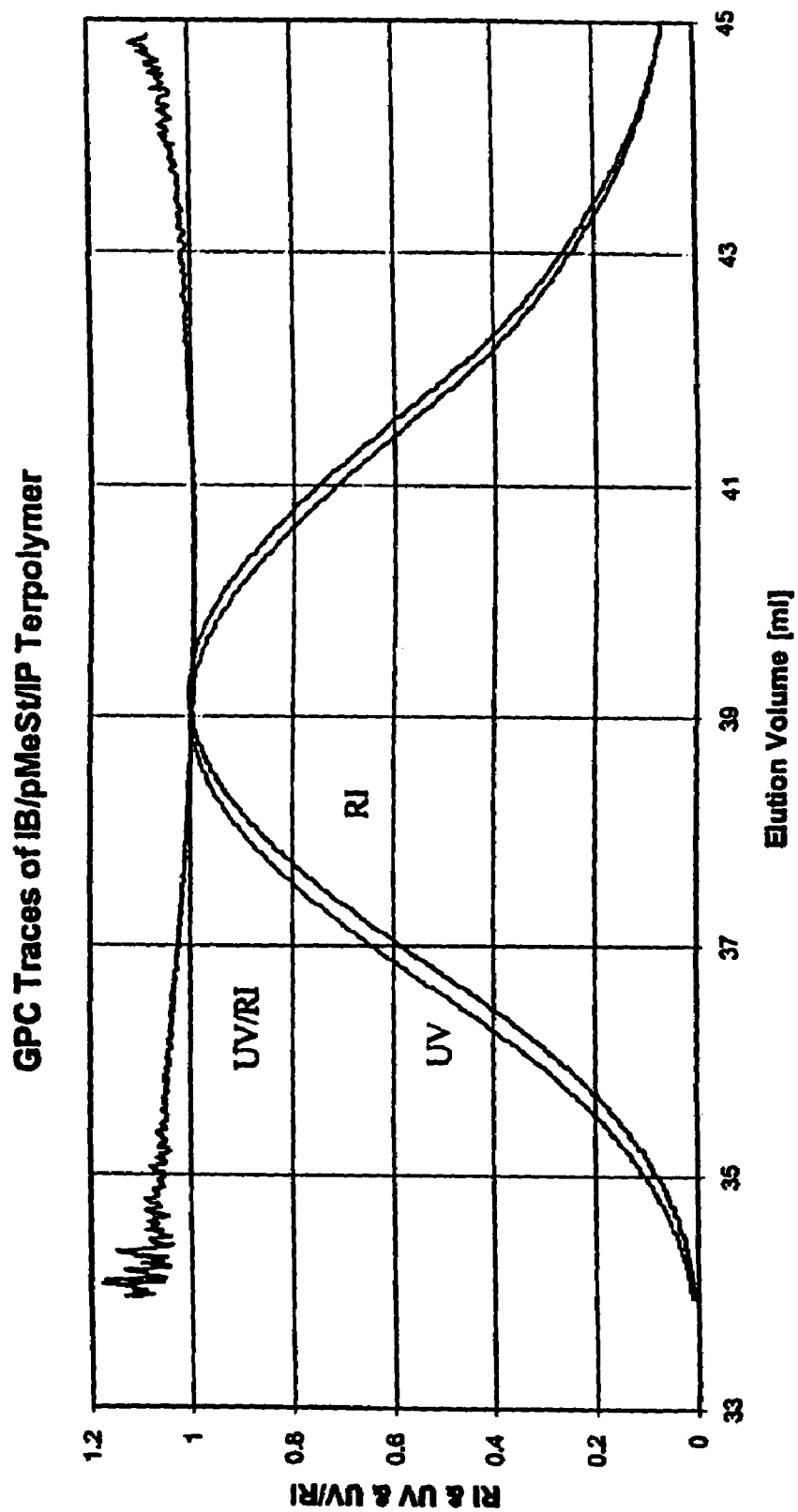
FIG. 1 illustrate the (Raman infrared) R.I. and (ultraviolet) U.V. (256 nm) traces of the GPC chromatogram of terpolymers in accordance with the present invention.

Thus, the present terpolymers are derived and the present process relates to the use of a monomer mixture comprising a $C_4$ to $C_8$ monoolefin monomer, a $C_4$ to $C_{14}$ multiolefin monomer and a styrenic monomer.

Preferably, the monomer mixture comprises from about 80% to about 99% by weight $C_4$ to $C_8$ monoolefin monomer, from about 0.5% to about 5% by weight $C_4$ to $C_{14}$ multiolefin monomer and from about 0.5% to about 15% by weight styrenic monomer. More preferably, the monomer mixture comprises from about 85% to about 99% by weight $C_4$ to $C_8$ monoolefin monomer, from about 0.5% to about 5% by weight $C_4$ to $C_{14}$ multiolefin monomer and from about 0.5% to about 10% by weight styrenic monomer. Most preferably, the monomer mixture comprises from about 87% to about 94% by weight $C_4$ to $C_8$ monoolefin monomer, from about 1% to about 3% by weight $C_4$ to $C_{14}$ multiolefin monomer and from about 5% to about 10% by weight styrenic monomer.

The preferred $C_4$ to $C_8$ monoolefin monomer may be selected from the group comprising isobutylene, 2-methylpropene-1, 3-methylbutene-1, 4-methylpentene-1, 2-methylpentene-1, 4-ethylbutene-1, 4-ethylpentene-1 and mixtures thereof. The most preferred $C_4$ to $C_8$ monoolefin monomer comprises isobutylene.

The preferred $C_4$ to $C_{14}$ multiolefin monomer may be selected from the group comprising isoprene, butadiene-1,3, 2,4-dimethylbutadiene-1,3, piperyline, 3-methylpentadiene-1,3, hexadiene-2,4, 2-neopentylbutadiene-1,3, 2-methlyhexadiene-1,5, 2,5-dimethlyhexadiene-2,4, 2-methylpentadiene-1,4, 2-methylheptadiene-1,6, cyclopentadiene, methylcyclopentadiene, cyclohexadiene, 1-vinyl-cyclohexadiene and mixtures thereof. The most preferred $C_4$ to $C_{14}$ multiolefin monomer comprises isoprene.

The preferred styrenic monomer may be selected from the group comprising p-methylstyrene, styrene, α-methylstyrene, p-chlorostyrene, p-methoxystyrene, indene (including indene derivatives) and mixtures thereof. The most preferred styrenic monomer may be selected from the group comprising styrene, p-methylstyrene and mixtures thereof.

As stated hereinabove, the butyl polymer is halogenated. Preferably, the butyl polymer is brominated or chlorinated. Preferably, the amount of halogen is in the range of from about 0.1 to about 8%, more preferably from about 0.5% to about 4%, most preferably from about 1.5% to about 3.0%, by weight of the polymer.

The halogenated butyl polymer may be produced by halogenating a previously produced butyl polymer derived from the monomer mixture described hereinabove. The manner by which the butyl polymer is produced is conventional and within the purview of a person of ordinary skill in the art. Thus, the process for producing the butyl polymer may be conducted at a temperature conventional in the production of butyl polymers (e.g., in the range of from about −100° C. to about +50° C.; usually less than −90° C.) in the presence of a conventional catalyst (e.g., aluminum trichloride). The butyl polymer may be produced in a conventional manner, by polymerization in solution or by a slurry polymerization method. Polymerization is preferably conducted in suspension (the slurry method). For more information on the production of butyl rubber, see, for example, any of the following:

1. Ullmann's Encyclopedia of Industrial Chemistry (Fifth, Completely Revised Edition, Volume A23; Editors Elvers et al.).
2. "Cationic Polymerization of Olefins: A Critical Inventory" by Joseph P. Kennedy (John Wiley & Sons, Inc.© 1975); and
3. "Rubber Technology" (Third Edition) by Maurice Morton, Chapter 10 (Van Nostrand Reinhold Company© 1987).

The butyl polymer may then be halogenated in a conventional manner. See, for example, U.S. Pat. No. 5,886,106. Thus, the halogenated butyl rubber may be produced either by treating finely divided butyl rubber with a halogenating agent, such as chlorine or bromine, preferably bromine, or by producing brominated butyl rubber by intensive mixing, in a mixing apparatus, of brominating agents such as N-bromosuccinimide with a previously made butyl rubber. Alternatively, the halogenated butyl rubber may be produced by treating a solution or a dispersion in a suitable organic solvent of a previously made butyl rubber with corresponding brominating agents. See, for more detail, Ullmann's Encyclopedia of Industrial Chemistry (Fifth, Completely Revised Edition, Volume A23; Editors Elvers et al.) and/or "Rubber Technology" (Third Edition) by Maurice Morton, Chapter 10 (Van Nostrand Reinhold Company© 1987). The amount of halogenation during this procedure may be controlled so that the final terpolymer has the preferred amounts of halogen described hereinabove. The specific mode of attaching the halogen to the polymer is not particularly restricted and those of skill in the art will recognize that modes other than those described above may be used while achieving the benefits of the invention.

The present halogenated butyl rubber may be used for the production of vulcanized rubber products. For example, useful vulcanizates may be produced by mixing the halogenated butyl rubber with carbon black and/or other known ingredients (additives) and crosslinking the mixture with a conventional curing agent in a conventional manner.

Embodiments of the present invention will be illustrated with reference to the following Examples, which should not be use to construe or limit the scope of the present invention. In the Examples, "pbw" means parts by weight and "phr" means parts by weight per 100 parts by weight rubber or polymer product.

EXAMPLES 1-7

In the Examples, isobutylene (IB, Matheson, 99%) and methyl chloride (MeCl, Matheson, 99%) were used as received. Isoprene (IP, Aldrich 99.9%), p-methyl styrene (p-MeSt, Aldrich 97%) and styrene (St, Aldrich 99%) were passed through a t-butyl catechol inhibitor remover prior to usage. Aluminum trichloride (Aldrich 99.99%), stearic acid (NBS, technical grade) and zinc oxide (Midwest Zinc Co., technical grade) were used as received.

All polymerizations were carried out in an MBraun MB™ 150B-G-I dry box.

A saturated catalyst solution was prepared by combining approximately 1 g of $AlCl_3$ with 100 mL of MeCl. This solution was stirred for a period of 30 minutes at a temperature of −30° C.

IB, IP, p-MeSt and St were charged, according to the concentrations reported in Table 1, into a 2 liter baffled glass reactor which was equipped with a stainless steel stirrer and a thermocouple. The reactor containing the monomers was cooled to −95° C., after which 10 mL of catalyst solution was introduced into the reactor. The polymerizations were carried out until a maximum temperature was reached. The polymerizations were terminated with the addition to the reactor of 10 mL of ethanol. The polymer was recovered by dissolving in hexane, followed by ethanol coagulation. The polymer was then dried in a vacuum oven at 40° C. until a constant weight was reached.

As will be apparent, neither p-MeSt nor St were used in Example 1. Accordingly, this Example is provided for comparative purposes only and is outside the scope of the invention.

Molecular weight and molecular weight distribution were determined by GPC equipped with an ultraviolet (U.V.) and Raman infrared (R.I.) detector using 6 Waters Ultrastyragel columns (100, 500, $10^3$, $10^4$, $10^5$ and $10^6$ Å), thermostated at 35° C. The mobile phase was THF at 1 mL/min. rate. Flow rate was monitored by the use of elementary sulfur as internal marker. The instrument was calibrated with 14 narrow MWD PS standards. Molecular weight averages were calculated using the Universal Calibration Principle using $K^{PSt}=1.12\times 10^{-4}$ dl/g, $\alpha_{PSt}=0.725$, $K_{PIB}=2.00\times 10^{-4}$ dl/g and $\alpha_{PiB}=0.67$. Calcium stearate, ESBO and EXO values were determined by FTIR. 500 MHz $^1$H NMR spectra were obtained in a conventional manner and the evaluation of the spectra obtained was done in a conventional manner—see, for example, (i) Chu et al., *Macromolecules* 18, 1423 (1985), and (ii) Chu et al., *Rubber Chem. Technol.* 60,626 (1987). Bromine content was determined by Oxygen Flask Combustion and Tg values were determined by DSC. Hot air aging studies were carried out according to ASTM-D573-81.

Figure 2:
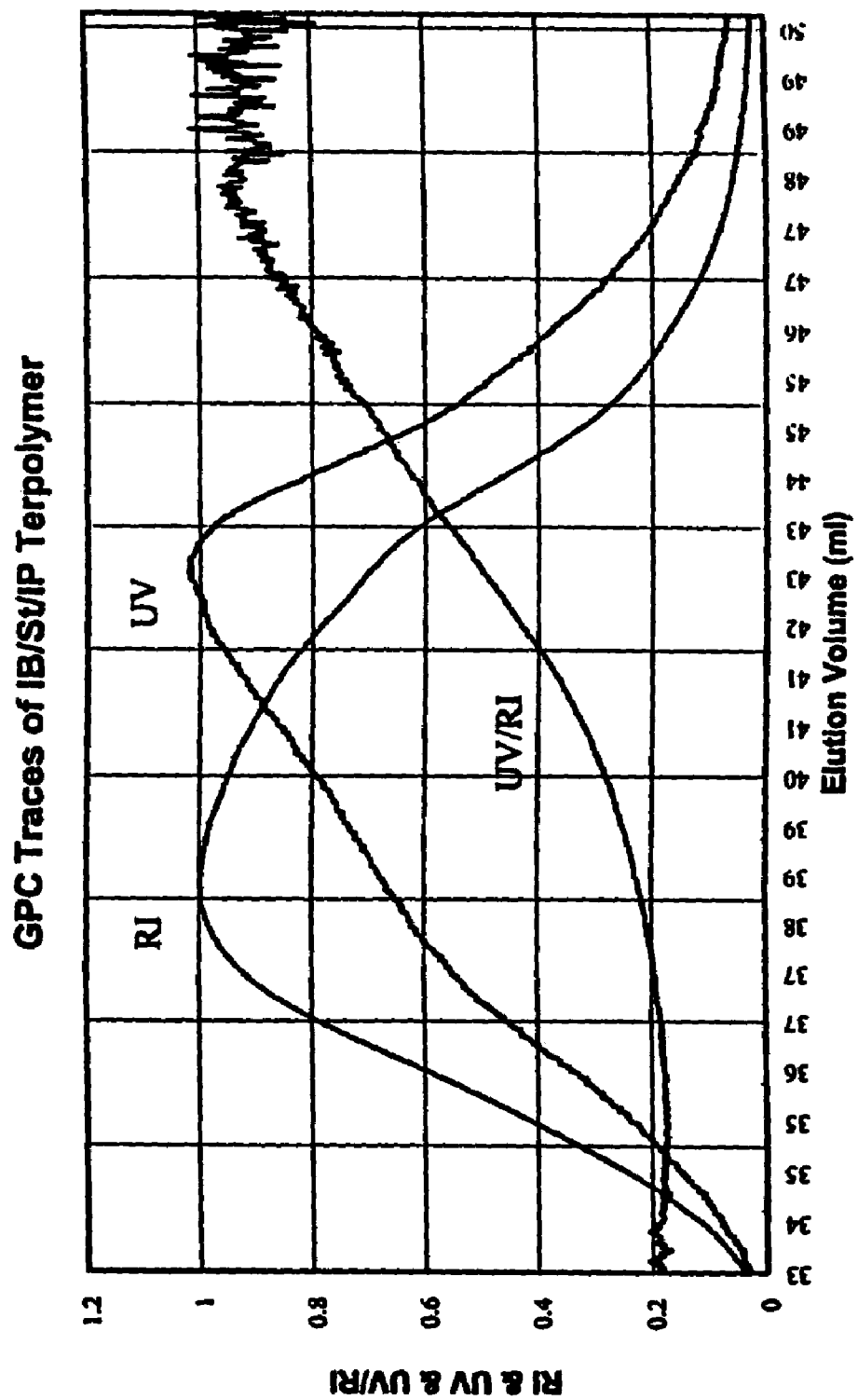
FIG. 2 illustrate the (Raman infrared) R.I. and (ultraviolet) U.V. (256 nm) traces of the GPC chromatogram of terpolymers in accordance with the present invention.

FIGS. 1 and 2 illustrate the R.I. and U.V. (256 nm) traces of the GPC chromatogram of a p-MeSt terpolymer (Example 4) and a St terpolymer (Example 7), respectively. Comparison of the R.I. and U.V. traces provides information about the compositional homogeneity of the polymer as a function of molecular weight. The R.I. signal is proportional to the total mass of the polymer chain. The U.V. signal is proportional to the number of aromatic monomer units incorporated into the chain, since U.V. absorption of IB and IP units are negligible at 256 nm compared to that of the aromatic ring.

The R.I. and U.V. traces of the pMeSt terpolymer show near complete overlapping. The U.V./R.I. ratio, which is proportional to the p-MeSt content of the given molecular weight fraction, is substantially constant over the entire molecular weight range. These results confirm that the reactivity of IB and p-MeSt is very similar toward the isobutylene capped growing cation.

In contrast, the St terpolymer exhibits non-overlapping U.V. and R.I. traces. The U.V./R.I. ratio, i.e., the styrene content of the polymer increases by a factor of about four as molecular weight decreases (elution volume increases), which is an indication that St acts as a chain transfer agent and has lower reactivity toward the IB capped growing cation than IB.

The foregoing analysis confirms the formation of a random copolymer.

Each batch of polymer product produced was brominated in the following manner.

The polymer product was dissolved in hexane to produce a polymer cement to which 0.08 phr octylated diphenylamine (ODPA) and 0.017 phr Irganox™ 1010 was added. Thereafter, the cement was solvent stripped and mill dried.

The resulting homogeneous rubber was once again cut into pieces and redissolved in hexane. The so-produced polymer cement was then transferred to a 12 liter baffled reactor equipped with a mechanical stirrer and two syringe ports. The cement container was rinsed with hexane and dichloromethane. Water was then added to the reactor and the mixture was stirred for several minutes.

Bromination of the polymer product was started by injecting the appropriate amount of bromine into the reactor. After 4 minutes of reaction time, the reaction was terminated by the injection of caustic solution (6.4 wt % NaOH). The mixture was allowed to stir for an additional 10 minutes and a stabilizer solution containing 0.25 phr epoxidized soybean oil (ESBO), 0.02 phr ODPA and 0.003 phr Irganox™ 1076 was then added to the mixture. The brominated rubber mixture was then washed three times after which additional ESBO (0.65 phr) and calcium stearate (1.5 phr) were added to the cement prior to steam stripping. The polymer was finally dried on a hot mill.

Bromine concentration, rubber concentration (solids), water content and reaction time were all kept constant. During bromination, 30 vol % dichloromethane was used as a polar co-solvent in order to obtain improved control over the extent of reaction and, thereby, to obtain the same concentration of brominated structures (approximately 1.0 mol %) in all brominated polymer products. Stabilizer and antioxidant levels of the brominated terpolymers were kept constant. Calcium stearate level was set at 1.5 phr and ESBO level at 0.9 phr.

Figure 3:
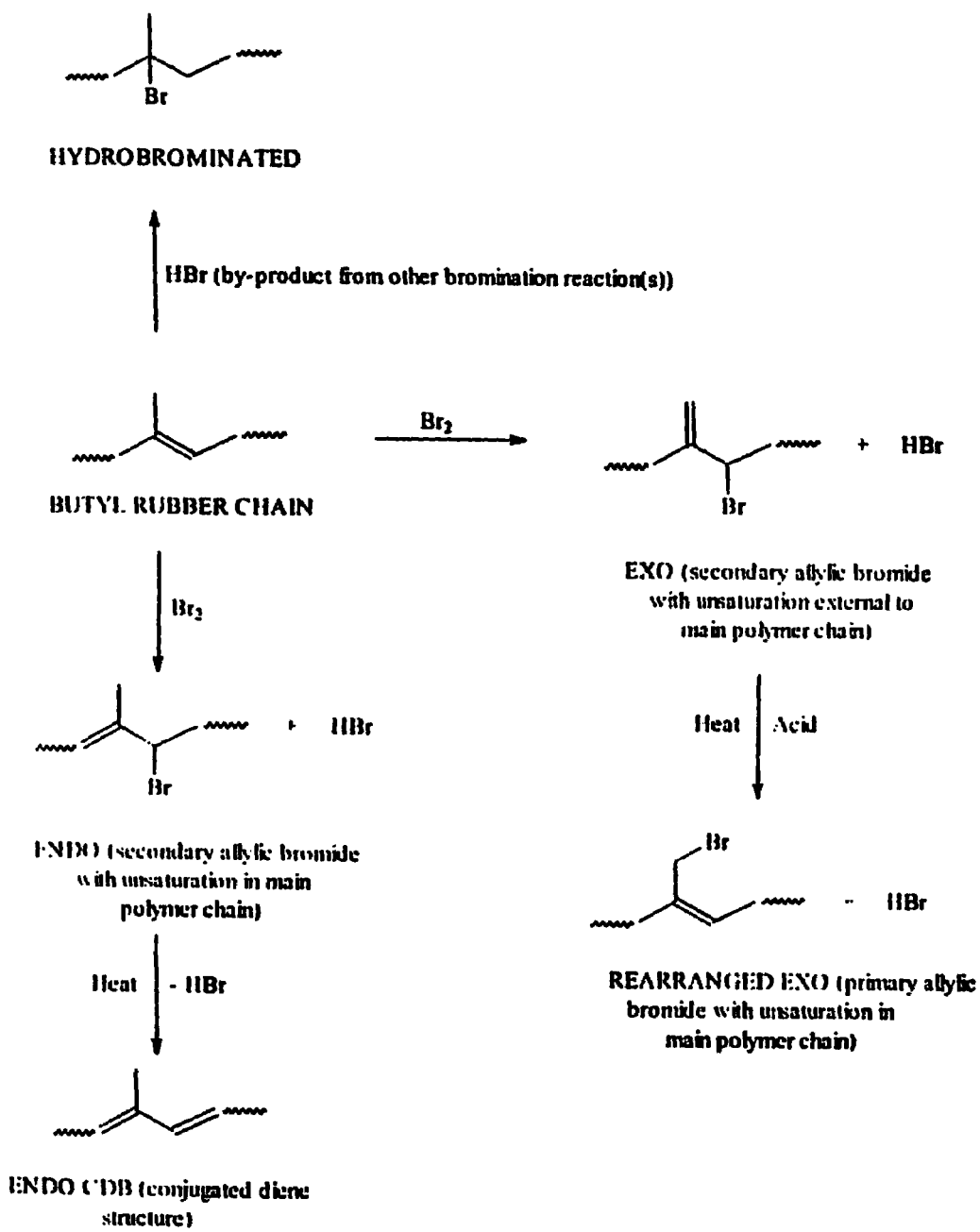
FIG. 3 illustrates a depiction of various bromine containing structures.

Composition of the brominated terpolymers, determined by 500 MHz HNMR, is reported in Table 2. The p-MeSt and St content determined before and after bromination are substantially consistent with one another. According to the results, the amount of primary brominated structures was lower in the terpolymer than in the control and decreased with increasing p-MeSt or St content. This is believed to be an indication that the aromatic ring underwent bromination in addition to the 1,4-IP enchainments. The presence of a brominated aromatic ring was estimated from a mass balance: total bromine content of the samples minus the amount of bromine attached to the 1,4-IP units. The total bromine content of the samples was determined by oxygen flask combustion. Further, the amount of bromine attached to the 1,4-IP units was calculated from the HNMR results. Specifically, the calculation was derived from the sum of bromine containing structures: Exo.+Rearr.Exo.+Endo.+hydrobrominated—see FIG. 3 for a depiction of these various bromine containing structures. The results are reported in Table 3.

With reference to Table 3, the two values for bromine content are reasonably matched in Example 2, indicating that the bromination of the aromatic ring is negligible. With reference to Examples 3 and 4, respectively, the two values for bromine content deviate indicating that the aromatic ring underwent bromination. The deviation between the two values is even more pronounced in the case of the styrene terpolymers (i.e., Examples 5-7). This is not surprising since, from a steric hinderance viewpoint, the more accessible para-position is not blocked in the case of styrene, and the ortho and para orienting affect of the alkyl group (polymer backbone).

For each Example, a gum vulcanizate was prepared by adding 1 phr of stearic acid and 5 phr of zinc oxide to the brominated polymer on a mill set to 40° C. (i.e., no filler or oil was used during vulcanization). Cure behaviour was determined by ODR Monsanto Rheometer (3 degree arc, 166° C.). Full (6×6 inches) and half sized (3×3 inches) macro sheets were prepared from these compounds by curing the compound at 166° C. for 30 minutes.

Figure 4:
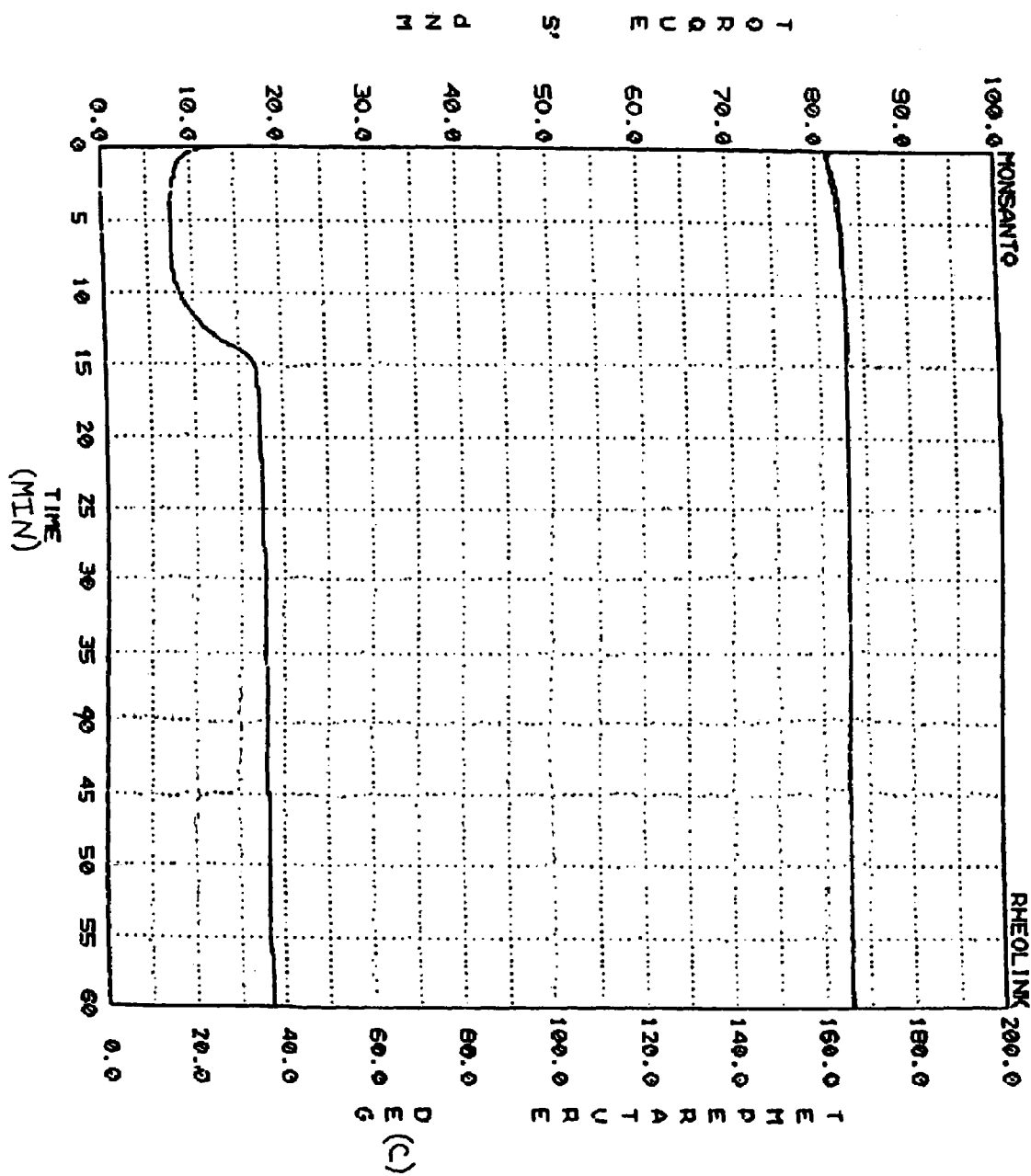
FIG. 4 illustrates the cure behaviour of a conventional polymer.
Figure 5:
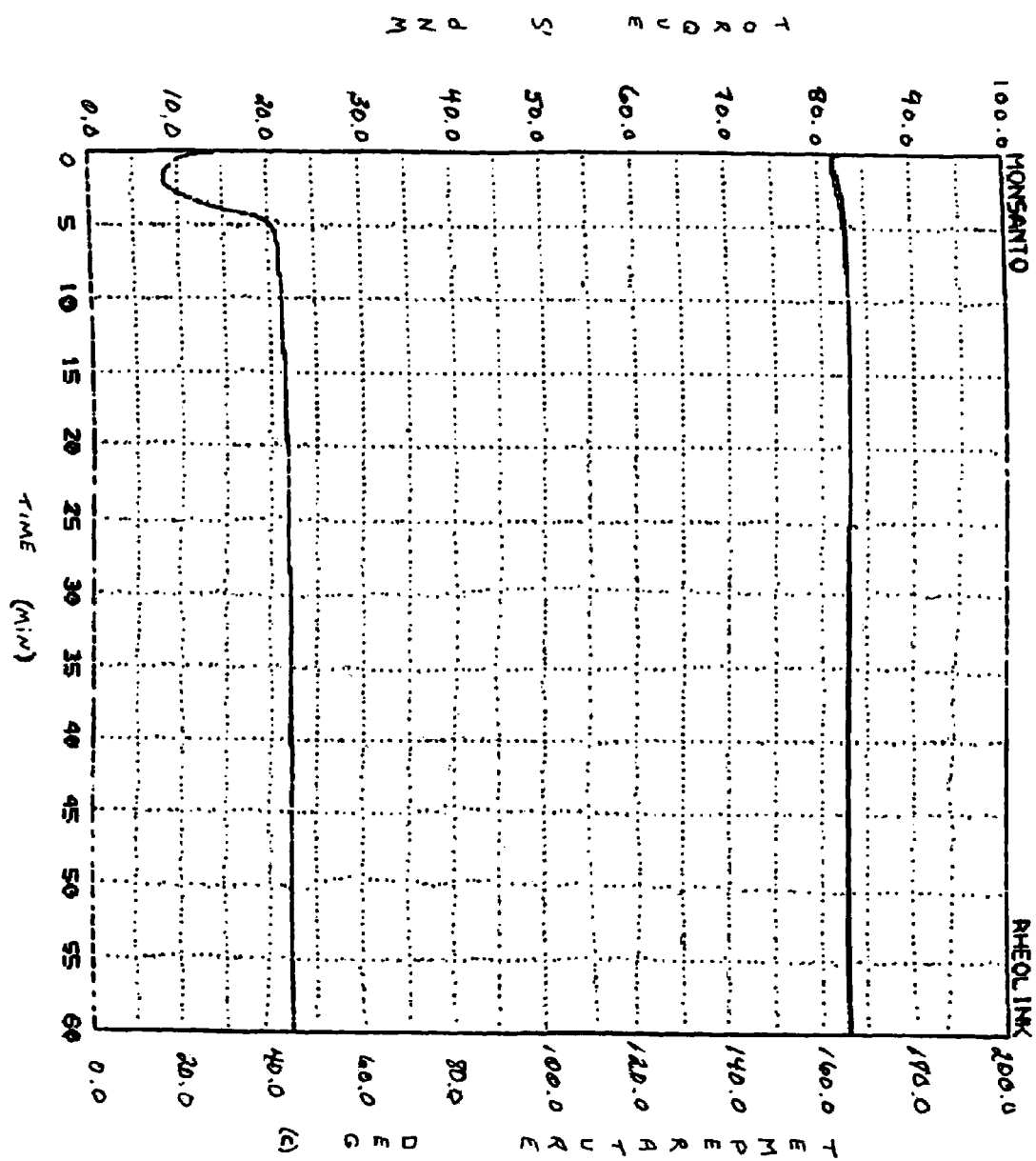
FIG. 5 illustrate the cure behaviour of terpolymers in accordance with the present invention.
Figure 6:
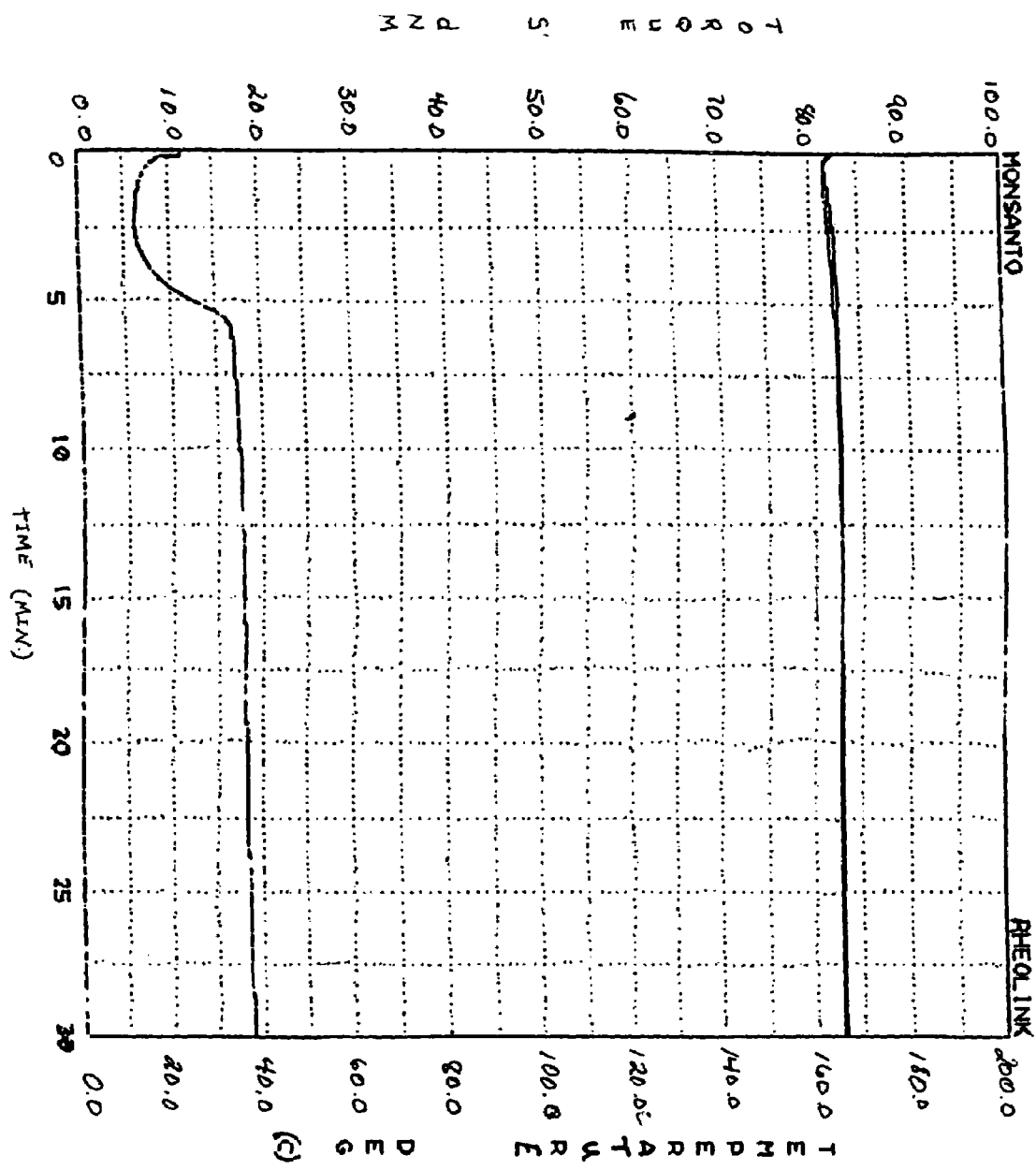
FIG. 6 illustrate the cure behaviour of terpolymers in accordance with the present invention.

FIGS. 4, 5 and 6 show the cure behaviour of the polymers of Examples 1 (control), 2 (low p-MeSt content terpolymer) and 6 (medium St content terpolymer), respectively. Cure time and torque values obtained for all the compounds are listed in Table 4.

According to the rheometry charts, the rubber produced in Example 1 shows a large trough or long induction period before the onset of curing. Specifically, the copolymer produced in Example 1 reaches a Tc50 point (half cured state) in approximately 13 minutes and a Tc90 point in approximately ~20 minutes. On the other hand, the terpolymers produced in Examples 2 (low p-MeSt content terpolymer) and 6 (medium St content terpolymer) possess narrower torque curves and are observed to reach their Tc50 point in less than half the time in spite of the fact that the Examples 2 and 6 terpolymers contained 10-35% less Exo than the Example 1 copolymer. This is evidence that the aromatic rings take part in the curing reaction.

The Mh and Mh-Ml values of the terpolymers produced in Examples 2 (low p-MeSt content terpolymer) and 6 (medium St content terpolymer) decreased with increasing p-MeSt or St content due to the decreasing Exo content. However, the obtained torque values were at least the same or even higher than that of the control. The most meaningful comparison can be made by comparing the delta torque values of the Example 1 copolymer (Exo=0.97 mol %) with the Example 2 terpolymer (Exo=0.87 mol %, p-MeSt=2.69 mol %) and with the Example 6 terpolymer (Exo=0.85 mol %, St=1.81). By comparing the delta torque values, the effect of Mooney can be accounted for. According to the results reported in Table 4, both terpolymers gave higher delta torque values (14.0 dNm for Example 2 and 12.4 dNm for Example 6) than Example 1 (10.8 dNm). This difference again is evidence that the aromatic rings do participate in the crosslinking reaction.

In each of the Examples, the rubber was cured at 166° C. for 30 minutes. The cured sheets were placed at room temperature for a period of sixteen hours prior to cutting them into tensile test pieces according to standard test methods (ASTM D412-68). Each vulcanizate was subjected to hot air aging tests (ASTM D573-81) under two different conditions: 120° C. for 168 hours and 140° C. for 168 hours.

Figure 7:
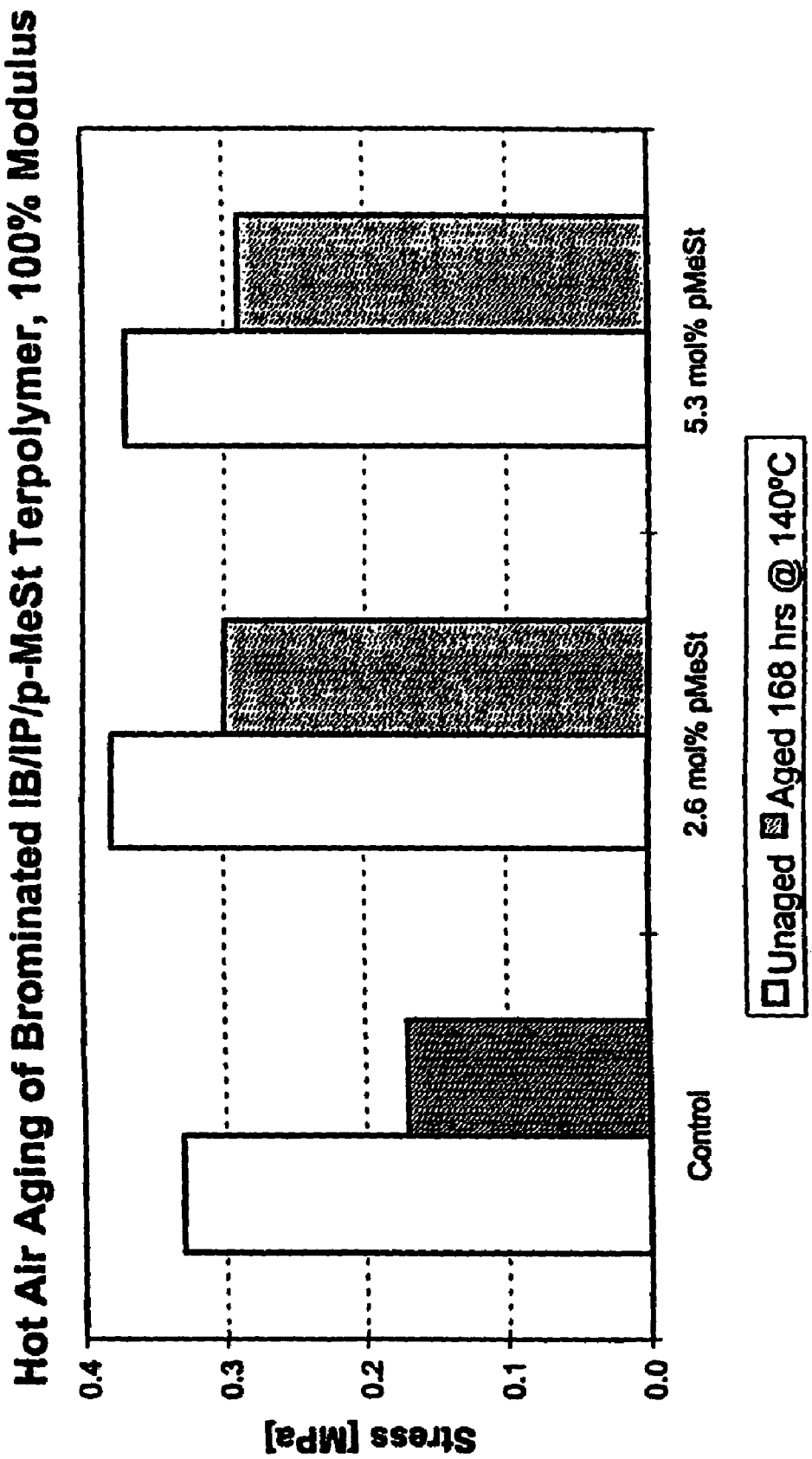
FIG. 7 illustrate hot air aging properties of terpolymers in accordance with the present invention.
Figure 8:
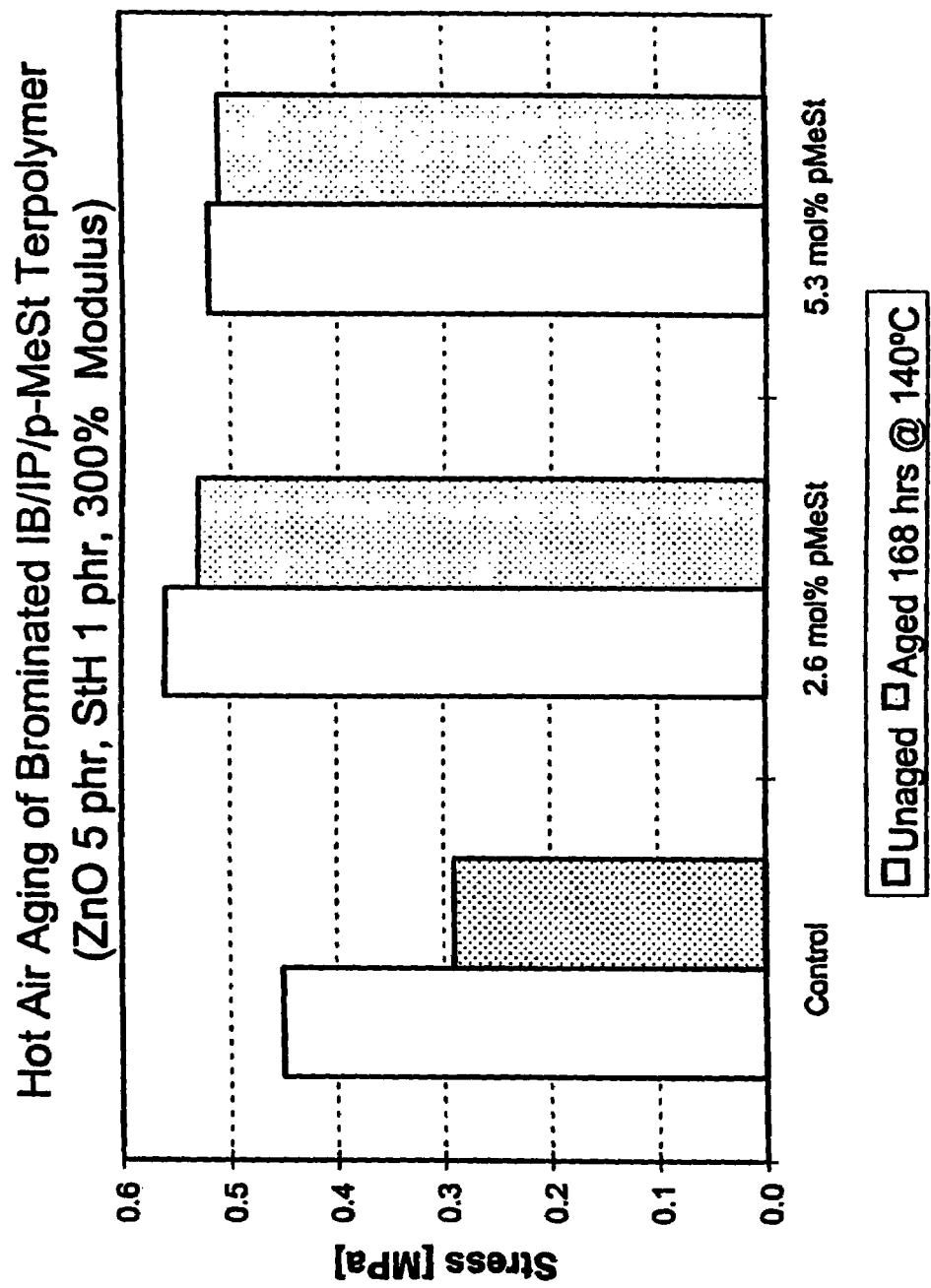
FIG. 8 illustrate hot air aging properties of terpolymers in accordance with the present invention.

The hot air aging test results for the rubbers produced in Examples 1-3 and 5-7 are reported in Table 5. Further, FIG. 7 illustrates the modulus at 100% elongation. Unaged terpolymers show approximately 15% higher modulus over the control, which is consistent with the measured higher torque values. The 100% modulus of the control sample decreased by about 50% upon 168 hours hot air aging at 140° C. The terpolymers displayed a better resistance to aging: 100% modulus decreased only by about 25%. FIG. 8 illustrates the modulus at 300% elongation before and after hot air aging for 168 hrs at 140° C. The 300% modulus of the copolymer of Examples shows a decrease of 36% upon aging. In contrast, 300% modulus of the terpolymers decreased only by about 2-5%.

Table 5 also summarizes the unaged stress strain results of the St terpolymers and the results of the limited hot air aging study carried out using the low St content terpolymer (Example 5). Here again the modulus of the terpolymers is somewhat higher than that of the control. The 100% modulus of the St terpolymer decreased by 30% and the 300% modulus by 16% as a result of 168 hrs/140° C. hot air aging, indicating a better aging resistance over the copolymer of Example 1.

While the present invention has been described with reference to preferred and specifically exemplified embodiments, it will of course be understood by those of skill in the art that various modifications to these preferred and exemplified embodiments may be made without the parting from the spirit and scope of the invention.

All publications, patents and patent applications referred to herein are incorporated by reference in their entirety to the same extent as if each individual publication, patent or patent application was specifically and individually indicated to be incorporated by reference in its entirety.

TABLE 1

| Example | [p-MeSt]¹ (mol/L) | [St]¹ (mol/L) | Mw, ×10³ | Mw/Mn | [IP] (mol %) | [p-MeSt]² (mol %) | [St]² (mol %) |
|---|---|---|---|---|---|---|---|
| 1 | — | — | 474 | 4.3 | 1.37 | — | — |
| 2 | 0.055 | — | 440 | 2.9 | 1.26 | 2.63 | — |
| 3 | 0.11 | — | 375 | 2.9 | 1.12 | 5.3 | — |
| 4 | 0.22 | — | 400 | 2.2 | 0.86 | 10.6 | — |
| 5 | — | 0.055 | 580 | 4.2 | 1.24 | — | 0.83 |
| 6 | — | 0.11 | 540 | 4.6 | 1.15 | — | 1.71 |
| 7 | — | 0.22 | 475 | 4.4 | 1.00 | — | 3.58 |

¹Concentration in polymerization reactor.
²Concentration in polymer product.
Notes:
[IB] in monomer feed to polymerization reactor □ 1.95 mol/L
[IP] in monomer feed to polymerization reactor □ 0.055 mol/L

TABLE 2

| | Example | | | | | | |
|---|---|---|---|---|---|---|---|
| | 1 | 2 | 3 | 4 | 5 | 6 | 7 |
| Before Bromination | | | | | | | |
| 1,4-IP (mol %) | 1.46 | 1.26 | 1.12 | 0.86 | 1.24 | 1.15 | 1 |
| p-MeSt (mol %) | — | 2.63 | 5.3 | 10.6 | — | — | — |
| St (mol %) | — | — | — | — | 0.83 | 1.71 | 3.6 |
| After Bromination | | | | | | | |
| p-MeSt (mol %) | — | 2.69 | 5.29 | 11.3 | — | — | — |
| St (mol %) | — | — | — | — | 0.97 | 1.81 | 4.05 |
| 1,4-IP (mol %) | 0.39 | 0.21 | 0.16 | 0 | 0.44 | 0.3 | 0.3 |
| Exo (mol %) | 0.97 | 0.87 | 0.79 | 0.63 | 0.71 | 0.85 | 0.7 |
| Endo (mol %) | 0.05 | 0.04 | 0.04 | 0.03 | 0.04 | 0.05 | 0.03 |
| Endo CDB (mol %) | 0.03 | 0.02 | 0.02 | 0.02 | 0.02 | 0.03 | 0.03 |
| Total primary (mol %) | 1.05 | 0.93 | 0.85 | 0.68 | 0.77 | 0.93 | 0.76 |

TABLE 3

| Example | pMeSt (mol %) | St (mol %) | Br Content from HNMR (mol %) | Br Content by Oxy. Flask (mol %) |
|---|---|---|---|---|
| 1 | — | — | 1.02 | 1.16 |
| 2 | 2.69 | — | 1.02 | 1.04 |
| 3 | 5.29 | — | 0.95 | 1.13 |
| 4 | 11.26 | — | 0.84 | 1.33 |
| 5 | — | 0.97 | 0.78 | 1.3 |
| 6 | — | 1.81 | 0.9 | 1.49 |
| 7 | — | 4.05 | 0.73 | 1.54 |

TABLE 4

| | Example | | | | | | |
|---|---|---|---|---|---|---|---|
| | 1 | 2 | 3 | 4 | 5 | 6 | 7 |
| Exo (mol %) | 0.97 | 0.87 | 0.79 | 0.63 | 0.71 | 0.85 | 0.7 |
| pMeSt (mol %) | — | 2.69 | 5.29 | 11.26 | — | — | — |
| St (mol %) | — | — | — | — | 0.97 | 1.81 | 4.05 |
| Scorch 01 (min.) | 10.26 | 2.71 | 2.89 | 4.24 | 4.84 | 3.63 | 4.18 |
| Tc50 (min.) | 13.36 | 4.03 | 4.12 | 5.78 | 6.59 | 5.02 | 5.77 |
| Tc90 (min.) | 21.31 | 6.74 | 10.25 | 20.91 | 9.69 | 10.75 | 9.71 |
| Mh (dNm) | 18.57 | 22.48 | 18.79 | 17.98 | 18.35 | 18.81 | 20.69 |
| Ml (dNm) | 7.77 | 8.51 | 6.35 | 7 | 8.97 | 6.47 | 8.4 |
| Delta Torque (dNm) | 10.81 | 13.96 | 12.43 | 10.98 | 9.37 | 12.35 | 12.29 |

TABLE 5

| | Example | | | | | |
|---|---|---|---|---|---|---|
| | 1 | 2 | 3 | 5 | 6 | 7 |
| Unaged | | | | | | |
| Modulus @ 100% (MPa) | 0.33 | 0.38 | 0.37 | 0.39 | 0.42 | 0.4 |
| Modulus @ 300% (MPa) | 0.45 | 0.56 | 0.52 | 0.56 | 0.6 | 0.63 |
| Ultimate Tensile (MPa) | 3.5 | 2.1 | 2.7 | 4.1 | 4 | 3.4 |
| Ultimate Elongation (%) | 1055 | 910 | 1020 | 965 | 880 | 850 |
| Hardness Shore A2 (pts.) | 23 | 26 | 28 | 25 | 24 | 25 |
| Aged in air, 168 hours @ 120 □C. | | | | | | |
| Modulus @ 100% (MPa) | 0.36 | 0.41 | 0.4 | — | — | — |
| Modulus @ 300% (MPa) | 0.67 | 0.75 | 0.72 | — | — | — |
| Ultimate Tensile (MPa) | 2.6 | 1.9 | 1.9 | — | — | — |
| Ultimate Elongation (%) | 670 | 570 | 595 | — | — | — |
| Hardness Shore A2 (pts.) | 26 | 28 | 28 | — | — | — |
| Aged in air, 168 hours @ 140 □C. | | | | | | |
| Modulus @ 100% (MPa) | 0.17 | 0.3 | 0.29 | 0.27 | — | — |
| Modulus @ 300% (MPa) | 0.29 | 0.53 | 0.51 | 0.47 | — | — |
| Ultimate Tensile (MPa) | 1.8 | 2.1 | 2.2 | 2.8 | — | — |

TABLE 5-continued

| | Example | | | | | |
|---|---|---|---|---|---|---|
| | 1 | 2 | 3 | 5 | 6 | 7 |
| Ultimate Elongation (%) | 805 | 670 | 725 | 850 | — | — |
| Hardness Shore A2 (pts.) | 23 | 27 | 26 | 21 | — | — |

What is claimed is:

1. A halogenated butyl terpolymer comprising a $C_4$ to $C_8$ monoolefin monomer, a $C_4$ to $C_{14}$ multiolefin monomer and p-methylstyrene, wherein said terpolymers is compositionally homogenous as a function of molecular weight.

2. The halogenated butyl terpolymer defined in claim 1, wherein the $C_4$ to $C_8$ monoolefin monomer may be selected from the group comprising isobutylene, 2-methylpropene-1, 3-methylbutene-1, 4-methylpentene-1, 2-methylpentene-1, 4-ethylbutene-1, 4-ethylpentene-1 and mixtures thereof.

3. The halogenated butyl terpolymer defined in claim 1, wherein the $C_4$ to $C_8$ monoolefin monomer comprises isobutylene.

4. The halogenated butyl terpolymer defined in claim 1, wherein the $C_4$ to $C_{14}$ multiolefin monomer is selected from the group comprising isoprene, butadiene-1,3, 2,4-dimethylbutadiene-1,3, piperyline, 3-methylpentadiene-1,3, hexadiene-2,4, 2-neopentylbutadiene-1,3, 2-methlyhexadiene-1,5, 2,5-dimethlyhexadiene-2,4, 2-methylpentadiene-1,4, 2-methylheptadiene-1,6, cyclopentadiene, methylcyclo-pentadiene, cyclohexadiene, 1-vinyl-cyclohexadiene and mixtures thereof.

5. The halogenated butyl terpolymer defined in claim 3, wherein the $C_4$ to $C_{14}$ multiolefin monomer comprises isoprene.

6. The halogenated butyl terpolymer defined in claim 1, wherein the monomer mixture comprises from about 80% to about 99% by weight $C_4$ to $C_8$ monoolefin monomer, from about 0.5% to about 5% by weight $C_4$ to $C_{14}$ multiolefin monomer and from about 0.5% to about 15% by weight p-methylstyrene.

7. The halogenated butyl terpolymer defined in claim 1, wherein the monomer mixture comprises from about 85% to about 99% by weight $C_4$ to $C_8$ monoolefin monomer, from about 0.5% to about 5% by weight $C_4$ to $C_{14}$ multiolefin monomer and from about 0.5% to about 10% by weight p-methylstyrene.

8. The halogenated butyl terpolymer defined in claim 7, wherein the monomer mixture comprises from about 87% to about 94% by weight $C_4$ to $C_8$ monoolefin monomer, from about 1% to about 3% by weight $C_4$ to $C_{14}$ multiolefin monomer and from about 5% to about 10% by weight p-methylstyrene.

9. The halogenated butyl terpolymer defined in claim 1, wherein the terpolymer is brominated.

10. The halogenated butyl terpolymer defined in claim 1, wherein the terpolymer is chlorinated.

11. The halogenated butyl terpolymer defined in claim 1, wherein the amount of halogen is in the range of from about 0.1 to about 8% by weight of the terpolymer.

12. The halogenated butyl terpolymer defined in claim 11, wherein the amount of halogen is in the range of from about 0.5 to about 4% by weight of the polymer.

* * * * *